(12) United States Patent
Gerard

(10) Patent No.: US 9,415,923 B2
(45) Date of Patent: Aug. 16, 2016

(54) SYSTEM FOR PROVIDING A LIQUID-SUBSTANCE MIXTURE ATTRACTIVE TO AN ANIMAL

(71) Applicant: Novartis AG, Basel (CH)

(72) Inventor: Guillaume Gerard, Biederthal (FR)

(73) Assignee: Novartis AG, Basel (CH)

( * ) Notice: Subject to any disclaimer, the term of this patent is extended or adjusted under 35 U.S.C. 154(b) by 38 days.

(21) Appl. No.: 14/375,871

(22) PCT Filed: Jan. 30, 2013

(86) PCT No.: PCT/EP2013/051755
§ 371 (c)(1),
(2) Date: Jul. 31, 2014

(87) PCT Pub. No.: WO2013/113737
PCT Pub. Date: Aug. 8, 2013

(65) Prior Publication Data
US 2015/0203273 A1    Jul. 23, 2015

(30) Foreign Application Priority Data

Feb. 1, 2012 (EP) ..................................... 12153433
Aug. 22, 2012 (CH) ..................................... 1437/12

(51) Int. Cl.
    *B65D 81/32*       (2006.01)
    *A01K 7/00*        (2006.01)
    *A01K 7/02*        (2006.01)

(52) U.S. Cl.
    CPC . *B65D 81/32* (2013.01); *A01K 7/00* (2013.01); *A01K 7/02* (2013.01); *B65D 81/3205* (2013.01)

(58) Field of Classification Search
CPC .......... B65D 81/32; B65D 81/32; A01K 7/02; A01K 7/00
See application file for complete search history.

(56) References Cited

U.S. PATENT DOCUMENTS 4,536,409 A * 8/1985 Farrell .................. A23L 3/3436
                                            426/118

(Continued)

FOREIGN PATENT DOCUMENTS

| CH | WO 2011029731 A1 * | 3/2011 | .......... B65D 51/227 |
|----|---------------------|--------|------------------------|
| EP | 1 795 457 | 6/2007 | |
| EP | 1795457 | 6/2007 | |

OTHER PUBLICATIONS

International Search Report and Written Opinion for PCT Application No. PCT/EP2013/051755, completed Jul. 4, 2013, 9 pgs.

*Primary Examiner* — Viren Thakur
*Assistant Examiner* — Thanh H Nguyen
(74) *Attorney, Agent, or Firm* — Faegre Baker Daniels LLP

(57) ABSTRACT

A system for providing a liquid-substance mixture attractive to an animal comprises separate first and second containers (1, 2) which are closed prior to assembly. The first container (1) is made of an autoclavable material and comprises a first reservoir (11) for holding a liquid attractive to an animal and at least one first weakened portion (115) and first cutting means (114). The second container (2) comprises a second reservoir (20) for holding a substance to be administered to the animal, and at least one second weakened portion (205) and second cutting means (202). Upon assembly of the first and second containers (1, 2) the at least one second weakened portion (205) is cut by the first cutting means (114) and the at least one first weakened portion (115) is cut by the second cutting means (202). Thus, the first and second reservoirs (11, 20) are set in communication with one another to allow mixing of the liquid with the substance to form the liquid-substance mixture.

19 Claims, 10 Drawing Sheets

(56) References Cited

U.S. PATENT DOCUMENTS

| | | |
|---|---|---|
| 6,148,996 A | 11/2000 | Morini |
| 6,379,727 B1 | 4/2002 | Addy |
| 7,870,952 B2 * | 1/2011 | Fontana .............. B65D 51/2814 206/219 |
| 8,714,808 B2 | 5/2014 | Yamanaka |
| 2007/0017830 A1 * | 1/2007 | Neumeyer .......... B65D 51/2835 206/219 |
| 2008/0289976 A1 * | 11/2008 | Henry ................ B65D 81/3211 206/222 |
| 2010/0187240 A1 * | 7/2010 | Zimmerman ...... A47G 19/2261 220/592.2 |
| 2011/0266170 A1 * | 11/2011 | Ligon ................ B65D 81/3211 206/219 |

* cited by examiner

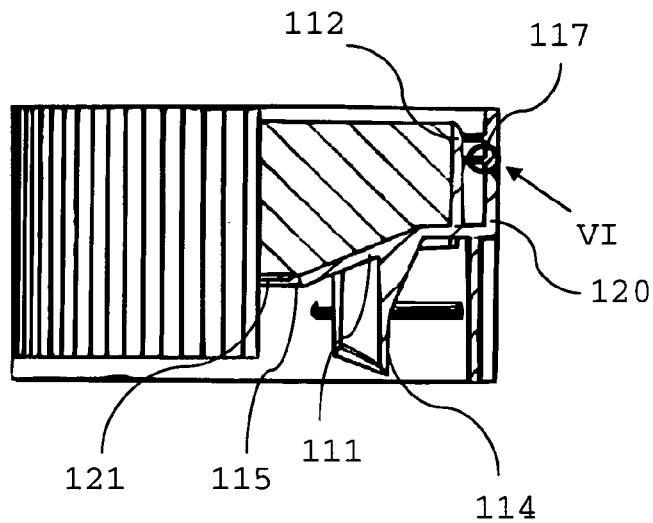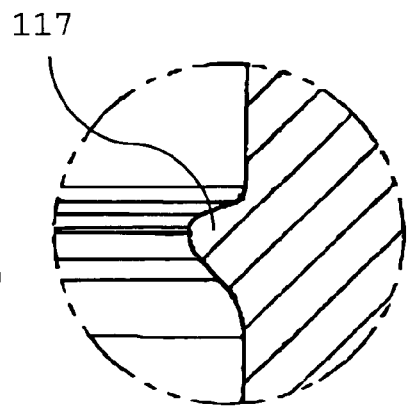
Fig. 5          Fig. 6
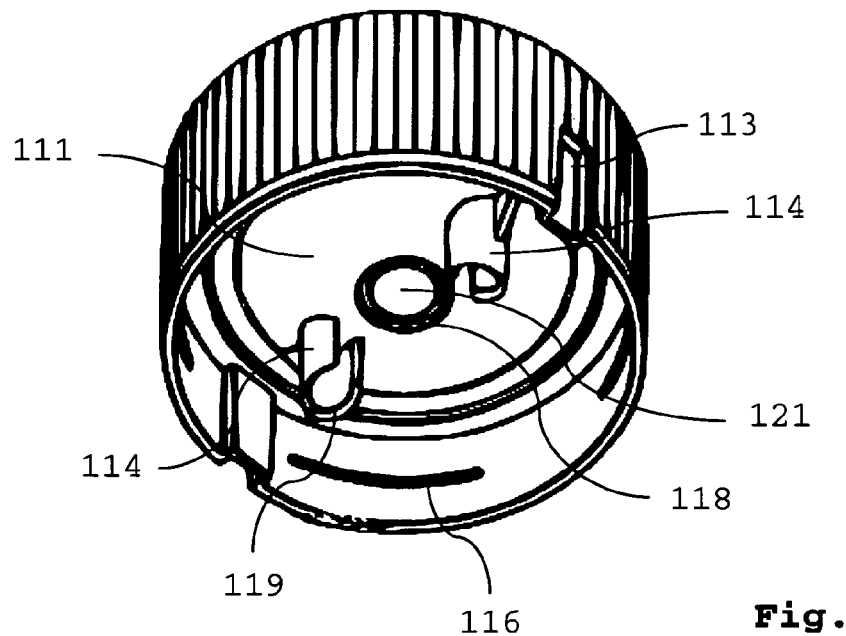
Fig. 7

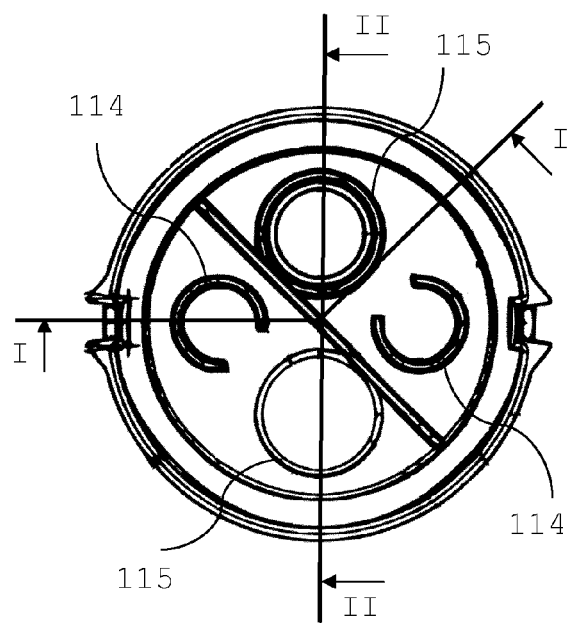
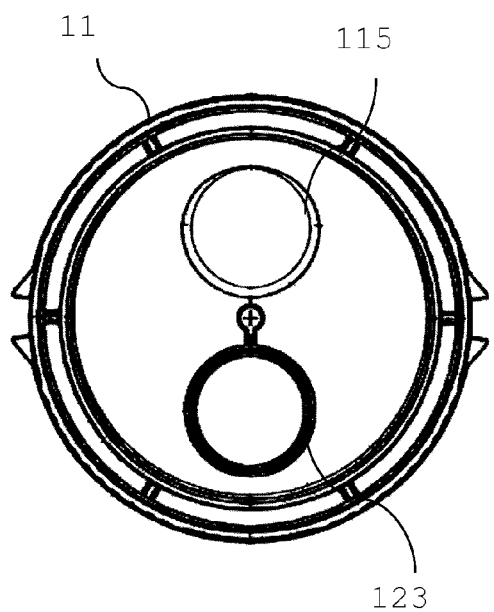
Fig. 18              Fig. 19
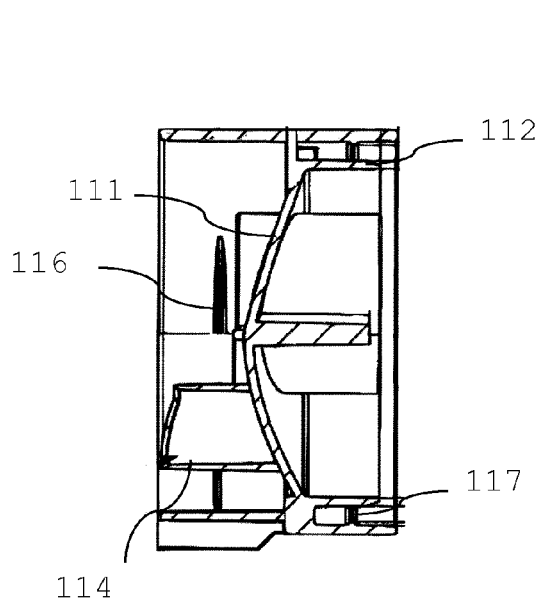
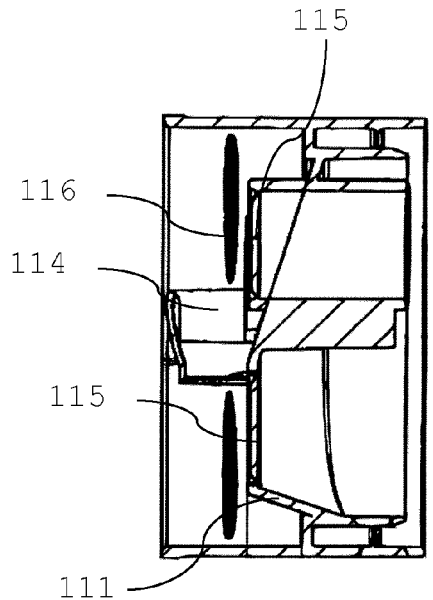
Fig. 20              Fig. 21

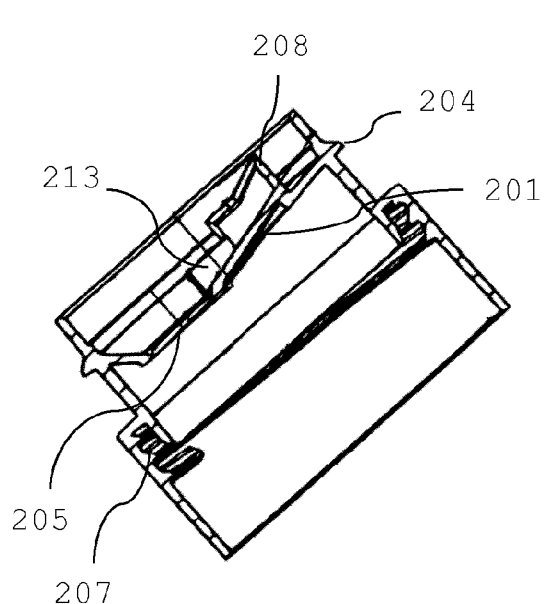
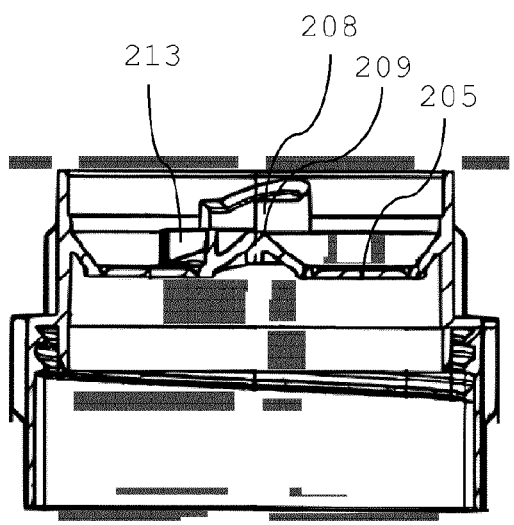
Fig. 26　　　　　　　　Fig. 27
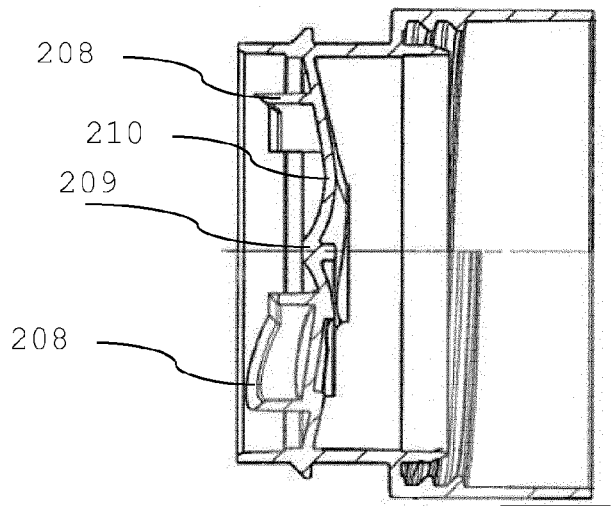
Fig. 28

SYSTEM FOR PROVIDING A LIQUID-SUBSTANCE MIXTURE ATTRACTIVE TO AN ANIMAL

This application is a 371 application of PCT/EP2013/051755, filed Jan. 30, 2013; the contents of which are incorporated by reference herein.

The invention refers to a system for providing a liquid-substance mixture attractive to an animal, as well as to a container for use in the system.

Various packaging is known for products comprising two or more components which are to be used as a mixture but which are stored separately before use. The separate storage of the components of the product may have various reasons, just to mention two of them the mixture may not be stable when being stored over a long period of time while the components are stable over said long period of time when being stored separately, or the mixture may be perishable within a comparatively short period of time while the components can be stored in a perishable-safe manner over a long period of time. As one example for such known packaging, a liquid is stored in a bottle which is provided with a cap comprising a separate capsule inside the cap that contains a powder. Upon use, the cap is screwed downwards further onto the bottle thereby rupturing the capsule, such that the powder exits the capsule and mixes with the liquid contained in the bottle. Thereafter, the liquid-powder mixture is ready for use. This is well-known in the field of medicine. For example, in the system disclosed in WO 98/38104 a cap comprising a capsule inside the cap is arranged on a container in which a liquid is stored. Inside the capsule a powder is stored. The cap is further provided with a cutting element. Upon screwing the cap downwards the cutting element cuts a lower end of the capsule, thereby allowing the powder to fall down from the capsule into the liquid stored in the container to form a liquid-powder mixture. A disadvantage of this known packaging is the fixed arrangement of the cap on the bottle even though the components (powder, liquid) are stored separately. Thereby, it is always predetermined that the powder stored in the capsule can only be mixed with the liquid stored in the container, so that the liquid-powder mixture is predetermined. Another aspect, which may be crucial especially in the medical field is the possibility to sterilize the packaging. This is critical for systems like those described in WO 98/38104 and may only be performed incompletely due to some surfaces in the region of the closure being only poorly accessible for the sterilizing media, if at all.

Therefore, it is an object of the invention to provide a system for providing a liquid-substance mixture attractive to an animal, which can be reliably sterilized and which allows for more flexibility as regards the possible combinations of liquids and substances.

This object is achieved by the system according to the instant invention as it is defined by the features of the independent claim. Further advantageous aspects of the system according to the invention are the subject of the dependent claims.

When being confronted with the problem of administering a substance such as medicine to an animal, the animal typically refuses to accept the substance. To overcome this problem, in the system according to the invention the substance is mixed with a liquid which is attractive to the animal, e.g. gravy or meat broth for carnivores or sugar syrup or fruit juice for herbivores, in order to produce liquid-substance mixture which is attractive to the animal as well (taste-masking). However, as with most substances, especially medicine, or perishable goods (e.g. gravy), these have to be stored separately for the reasons set out above until the moment of use.

According to the invention there is suggested a system for providing a liquid-substance mixture attractive to an animal, the system comprising separate first and second containers, wherein the first container is made of an autoclavable material. The first and second containers are capable of being assembled and are closed prior to assembly. The first container comprises a first reservoir for holding a liquid attractive to an animal, and further comprises at least one first weakened portion as well as first cutting means. The second container comprises a second reservoir for holding a substance to be administered to the animal, and further comprises at least one second weakened portion as well as second cutting means. The first cutting means, the second cutting means, the at least one first weakened portion and the at least one second weakened portion are arranged such that upon assembly of the first and second containers, the at least one second weakened portion of the second container is cut by the first cutting means of the first container and the at least one first weakened portion of the first container is cut by the second cutting means of the second container. Through this cutting operation, the first and second reservoirs of the first and second containers are set in communication with one another to allow mixing of the liquid contained in the first reservoir of the first container with the substance contained in the second reservoir of the second container to form a liquid-substance mixture. The liquid-substance mixture may then be provided to the animal, and due to the taste-masking of the substance the liquid-substance mixture is attractive to the animal, so that the liquid-substance mixture is easily accepted by the animal.

In a system comprising two separate, individual containers these two individual containers may be filled, where required autoclaved, packed and stored separately and independently from each other, so that proper sterilization and storage of the individual containers is not a problem. Also, the substance and the liquid to be mixed may be chosen individually, i.e. a selection can be made which is adapted to the needs and preferences of the particular animal. Should one of the containers get damaged, it can be replaced without having to replace the entire system. In addition, it is possible to select, bring together and assemble the two containers only at the moment of use. By the provision of cutting means and corresponding weakened portions, the containers are opened in a very controlled manner. Only at predetermined locations, i.e. at the weakened portions, the container is cut or pierced. Preferably, a weakened portion is a portion in a wall of a container having a thickness lower than the thickness of the rest of the wall, so that the container is opened only at the weakened portions by the respective cutting means. Generally, the containers are made of a solid and stable material for a safe storing and transport of the containers and for a secure storage of the content in the containers. Even at the weakened portions, the containers are sufficiently solid for a safe storing and transport of the containers and for secure storage of the content in the respective container. However, the weakened portions define a predetermined breaking point when being acted upon by the cutting means of the respective other container upon assembly of the two containers.

After assembly of the two containers the system may be shaken for an improved mixing of substance and liquid. Due to the containers being separate individual elements, one or in case both containers are made of an autoclavable material also both containers may be autoclaved separately such that there are no portions which are not accessible to sterilization media. In case the content of a container must be heated or cooked, e.g. gravy, this heating or cooking may be performed before filling the gravy into the container. However, since at least the first container is preferably autoclaved, the heating or cooking step may directly be combined with the autoclaving step such that a separate heating or cooking step is not necessary. Preferably the container/s are filled and closed and then at least the container comprising liquid but preferably both containers are autoclaved in one step. After autoclaving (or another sterilizing process) the individual container or containers may be packed under sterile conditions into an appropriate sterile packaging.

Due to the fact that the substance to be administered to the animal is mixed with a liquid attractive to the animal the liquid-substance mixture is voluntarily taken in by the animal, especially since the liquid may be chosen in accordance with the special preferences of the respective animal.

According to the present invention, the term animal encompasses in general all kinds of animals, for example mammals including humans, preferably companion animals, for example horses, donkeys, mules, dogs, cats and birds, in particular dogs and cats, especially cats. The system according to the invention is particularly suitable for small animals and domestic animals, for example cats, without being limited thereto.

In accordance with a further aspect of the system according to the invention, the first and second cutting means are constructed to cut the at least one second and first weakened portions in a manner such that the material of the at least one cut second and first weakened portions remains partially attached to the second and first containers, respectively. Thus, it is prevented that a piece of cut material falls into the substance or the liquid and is unintentionally taken in by the animal. It is also prevented that a completely cut piece of material blocks a so produced hole intended for the passing of the substance and/or the liquid. Cutting an opening into a wall of the container without completely cutting off a piece of material is achieved, for example, by cutting a slit into the wall so as to form a flap which is connected to the remaining wall via a flexible living hinge.

In accordance with a further aspect of the system according to the invention, the first and second containers are to be assembled such that a bottom wall of the first container and a top wall of the second container are facing one another. The bottom wall of the first container has at least one downwardly sloped bottom wall portion with the at least one first weakened portion being arranged at the lowermost location of the respective at least one downwardly sloped bottom wall portion. The top wall of the second container comprises at least one downwardly sloped top wall portion with the at least one second weakened portion being arranged at the lowermost location of the respective at least one downwardly sloped top wall portion. Further, the first cutting means are arranged to project from the bottom wall of the first container towards the respective at least one second weakened portion of the top wall of the second container. The second cutting means are arranged to project from the top wall of the second container towards the respective at least one first weakened portion of the bottom wall of the first container. The two containers are assembled by arranging them one on top of the other and by bringing together the bottom wall of the first container and the top wall of the second container. This results in that the at least one first weakened portion in the bottom wall of the first container is pierced by the second cutting means projecting from the top wall of the second container and in that the second weakened portion in the top wall of the second container is pierced by the first cutting means projecting from the bottom wall of the first container. The cutting means are constructed to project from the respective walls of the containers preferably to such an extent that upon assembly of the two containers the weakened portions are cut and the containers are tightly sealed such that spillage of the contents of the containers is prevented.

The sloped wall portions and the at least one first or second weakened portions arranged at the lowermost locations of the respective bottom or top wall portions support a flow of the content of the respective container into the direction of the respective weakened portions. This allows for a complete flow of the entire content of the first container through the pierced or cut weakened portions into the second container solely by gravity.

In accordance with a further aspect of the system according to the invention the first cutting means comprise two cutting posts which are arranged at a radial distance from the center of the bottom wall of the first container, while the first weakened portion is arranged at the center of the bottom wall of the first container. The second cutting means comprise one cutting post, which is arranged at the center of the top wall of the second container, while two second weakened portions are arranged at a radial distance from the center of the top wall of the second container. The radial distance of the two second weakened portions from the center corresponds to the radial distance of the cutting posts from the center of the bottom wall of the first container.

With one weakened portion being arranged at the center of the bottom wall of the first container and a corresponding cutting post being arranged at the center of the top wall of the second container, the bottom wall of the first container is pierced at its center and the liquid flows down from the first container to the center of and into the second container. In the second container, the liquid then flows along the sloped top wall portion or portions radially downwardly to the two weakened portions which are pierced open by the two corresponding cutting posts of the bottom wall of the first container. By the provision of more than one weakened portion and a corresponding number of cutting posts the flow of the contents from and into the containers is facilitated.

In accordance with another aspect of the system according to the invention, the first cutting means comprise two cutting posts. These two cutting posts and two first weakened portions are arranged at a radial distance from the center of the bottom wall of the first container. The second cutting means also comprise two cutting posts. These two cutting posts and two second weakened portions are also arranged at a radial distance from the center of the top wall of the second container. This radial distance corresponds to the radial distance of the respective two first weakened portions and the two cutting posts from the center of the bottom wall of the first container. A chimney-like post may be arranged on the bottom wall of the first container. The chimney-like post encircles one first weakened portion and projects from the bottom wall of the first container in a direction opposite a projecting direction of the first cutting means, such that a ventilation channel is created between the first reservoir and the second container through the cut or pierced one first weakened portion and the chimney-like post. The arrangement of the chimney-like post is preferably also such that the liquid contained in the first reservoir essentially passes through the other one of the two first weakened portions.

The arrangement of two weakened portions and two corresponding cutting posts may facilitate the flow of content from and into the containers. In a pairwise arrangement of weakened portions and cutting posts, for example two weakened portions and two cutting posts per container, one pair may also be used to facilitate ventilation of the container or preferably of both containers. While for example a liquid passes from the first reservoir into the second reservoir, an underpressure may be generated in the first reservoir by the outflowing liquid, thereby hindering a further liquid flow from the first reservoir into the second reservoir. By now providing a ventilation channel, ventilation of the first reservoir and a continuous flow of liquid are supported. A chimney-like post encircling a weakened portion and extending into the first reservoir prevents that liquid directly flows along the surface of the bottom wall of the first container through said weakened portion encircled by the chimney-like post. The chimney-like post essentially projects from the bottom surface in a direction opposite the projecting direction of the first cutting means, basically corresponding to an upward direction, when a first container is held or mounted horizontally. In preferred embodiments the first container is filled with liquid to a level, which level is lower than a height of the chimney-like post. By this, no or only a small amount of liquid may flow to or through the weakened portion encircled by the chimney-like post. It goes without saying that ventilation may be provided independently of the design of the cutting means and that a weakened portion must not be completely encircled by a chimney-like post. A weakened portion might for example also be arranged next to a wall of the first reservoir such that a wall portion of the first reservoir forms part of a ventilation channel.

According to an aspect of the system according to the invention, the top wall of the second cap comprises two downwardly sloped top wall portions arranged on each side of a ridge arranged across the top wall of the second cap. One second weakened portion and one cutting post is arranged on each side of the ridge. A wall element is arranged on the top wall of the second cap and between the one cutting post and the one second weakened portion arranged on one side of the ridge, such that a liquid entering the second cap along the one cutting post arranged on the one side of the ridge flows on said one side of the ridge along the wall element into the direction of said one second weakened portion arranged on said one side of the ride.

The ridge arranged across the top wall of the second container divides the top wall into two sides. Preferably, the ridge is arranged diagonally such as to divide the top wall into halves. Liquid or a substance getting to one side of the ridge remains on that side. This effect may be used for a liquid-substance mixing using one side of the ridge only. Ventilation between first and second container may then take place on the other side of the ridge without ventilation being disturbed by a liquid or substance flow. Sloped top wall portions thereby support the flow of liquid into the direction of the second weakened portions. Especially, if a system is shaken for a better mixing of liquid and substance or if a system is not held in a horizontal position it may be that liquid or substance also gets to the 'ventilation side'. In this case, sloped top wall portion(s) also on the 'ventilation side' may support a flow of liquid or substance into the direction of the weakened portion.

The wall element arranged between cutting post and weakened portion on the one side of the ridge guides liquid entering the second container and flowing on the surface of the top wall of the second container into the direction of the second weakened portion arranged on the one side of the ridge. The wall element preferably is arranged adjacent the cutting post in a liquid-tight manner and extends to the weakened portion. By this, the liquid may be guided in a center part of the cutting post directly to the weakened portion.

In some preferred embodiments, the cutting post or other cutting means arranged on the 'ventilation side' of the second container cut or pierce a first weakened portion of the first reservoir that is encircled by a chimney-like post as described above. By this, ventilation of first and second container is optimized through an as complete as possible separation of ventilation and mixing of liquid with substance and by a ventilation channel reaching from inside the first reservoir to inside the second reservoir.

In accordance with a further aspect of the system according to the invention the first and second containers comprise alignment members for mutual rotational alignment of the first and second containers upon assembly. Such alignment members support and guide the first and second containers relative to one another upon assembly of the system. In addition, the alignment members make sure that the cutting means and weakened portions of the containers are correctly arranged in positions corresponding to each other upon assembly of the containers. Also, tilting of the containers relative to each other is prevented.

An assembly of the system is preferably realized by a simple one-dimensional axial movement of the first and second containers relative to each other.

In accordance with a further aspect of the system according to the invention, the first and second containers each comprise two parts, with at least the respective two parts of the first container being assembled in a liquid-tight and oxygen-tight (including water-vapor tight) manner. Containers consisting of two parts may be manufactured in an easy and cost efficient way, and the containers can be conveniently filled and closed after being filled. Depending on the purpose and the contents of the container, the two parts may be constructed in a releasable or non-releasable manner. In order to prevent spillage of liquid the two parts of at least the first container are assembled in a liquid-tight manner. In case the liquid contained in the first container is a liquid that perishes comparatively quickly when being in contact with the environment, especially with oxygen, the first container is also assembled in an oxygen-tight manner. By assembling the first container both in a liquid-tight and oxygen-tight manner, the content is protected from negative influences by environmental conditions such as e.g. wetness, oxygen or germs. If required or appropriate, also the second container may be assembled in a liquid-tight and oxygen-tight manner. In addition, at least the two parts of the respective first container are preferably assembled in a manner so as to be properly autoclavable.

In accordance with a further aspect of the system according to the invention the two parts of the first container are adapted for being assembled in a non-releasable closed manner and the two parts of the second container are adapted for being assembled in a releasable manner. As regards the first container which is assembled in a non-releasable closed manner, the first container is filled and closed, preferably tamperproof and childproof, as well as liquid-tight and oxygen-tight. The first container is not intended to be opened any more, and particularly not prior to being cut or pierced upon assembly with the second container. As regards the second container which is assembled in a releasable manner, the second container may be opened, especially after assembly of the first and second containers and after mixing of the substance and the liquid. It is thus possible to get access to the liquid-substance mixture by reopening the second container, so that the liquid-substance mixture can either be taken out from one part of the second container so as to be poured into a feeding bowl, or may be presented to an animal in the said part of the container itself which then serves as a feeding bowl. For example, assembly of the first container in a non-releasable closed manner may be realized with the aid of press-fit members forming a press-fit connection, and assembly of the second container in a releasable manner may be realized with the aid of threads forming a screw connection. Press-fit and screw connections are well-known examples for non-releasable and releasable connections which are easy to manufacture.

In accordance with a further aspect of the system according to the invention the system comprises a base plate adapted for receiving and holding at least one of the first and second containers. A container, before or after assembly with the other container, may be placed into or onto the base plate. The base plate thus forms a stand (support) for the container or containers or parts thereof. Container and base plate may be provided with positioning means that help to properly position the container in the base plate. Preferably, the base plate comprises a slip-resistant portion at its bottom side in order for the system not to slip on a surface on which the base plate rests, and to provide a certain resistance against displacement when an animal eats or drinks directly from an opened container placed into or onto the base plate. Such a slip-resistant portion is preferably realized with an anti-slip insert (for example an O-ring) or with an anti-slip coating at the bottom side of the base plate. Also, placing the second container in the base plate where it is received and held facilitates the process of assembling the first and second containers, and further facilitates the process of opening the second container after the liquid-substance mixture has been produced. Opening of the second container can be performed by firmly pressing the base plate with the slip-resistant portion against the surface on which it rests while the upper part of the second container is removed from the lower part (e.g. by unscrewing the upper part of the second container from the lower part).

In accordance with a further aspect of the system according to the invention, the second container comprises an active substance or a vitamin and the first container comprises gravy or another liquid attractive to an animal. In general, the first container is capable of storing a liquid attractive to an animal as already mentioned above. The second container is capable of storing a substance to be administered to the animal, preferably an active substance, such as a medicament, like an OTC product (Over The Counter) or a prescription product. However, the substance may also be or comprise one or more vitamins, nutriments, restoratives or other substances to be administered to the animal.

In accordance with a further aspect of the system according to the invention the autoclavable material of the first container comprises an oxygen scavenger. In order to prevent the liquid contained in the first container from being in extensive contact with oxygen, the container itself may be sealed in an oxygen-tight manner as has been described above. Alternatively or in combination the material of the first container contains an oxygen scavenger which is a component capturing oxygen before the oxygen may negatively influence the liquid. In accordance with a further aspect of the system according to the invention also the second container is made of a material, preferably an autoclavable material, including an oxygen scavenger.

Yet a further aspect of the invention relates to a container for use in a system for providing a liquid-substance mixture attractive to an animal, as described above. The container comprises a reservoir for holding a substance to be administered to the animal in the form of a liquid-substance mixture or comprises a reservoir that is made of an autoclavable material and that comprises a reservoir for holding a liquid attractive to an animal. The container further comprises at least one weakened portion and cutting means. The at least one weakened portion is arranged in a wall of the container and the cutting means are arranged to project from said wall of the container. The container is configured to be assembled with a similar container. Such a similar container is also configured for use in a system for providing a liquid-substance mixture attractive to an animal, as described above. This similar container also comprises at least one weakened portion and cutting means arranged and projecting from one wall of the said similar container and corresponding to the weakened portion and the cutting means of the other container. The similar container is configured for being assembled with the one container.

The containers and the base plate can be manufactured by injection molding, preferably including an anti-slip portion of the base plate. An injection moldable and autoclavable material may be a suitable plastic material, such as polypropylene or polyamide. However, other autoclavable materials may also be used, such as metals or composite materials. Non-autoclavable material may also be a suitable plastic material, such as polyethylene (PE) or polyethylene terephthalate (PET).

The substance to be administered to the animal is preferably in the form of a powder or granules. However, it may also be a liquid or a paste-like substance. While not being mandatory, it is preferred that the liquid-substance mixture is a solution.

The invention is described in more detail with respect to the drawings, in which FIG. 1 shows an exploded view of an embodiment of the system according to the invention;

FIG. 5 shows a partially sectional side view of the reservoir (bottom part) of the first container of the system of FIG. 1;

FIG. 6 shows detail VI of the reservoir of FIG. 5;

FIG. 7 is a perspective bottom view of the reservoir (bottom part) of the first container of the system of FIG. 1;

FIG. 15 is a perspective top view of the cap (upper part) of the first container of a further embodiment of the system according to the invention;

FIGS. 16-21 show views of the reservoir (bottom part) of the first container of the further embodiment, wherein FIGS. 16 and 17 are perspective top and bottom views;

FIGS. 18 and 19 are bottom and top views;

FIGS. 20 and 21 are cross-sectional views of the reservoir along lines I-I and II-II;

Figures 22, 23:
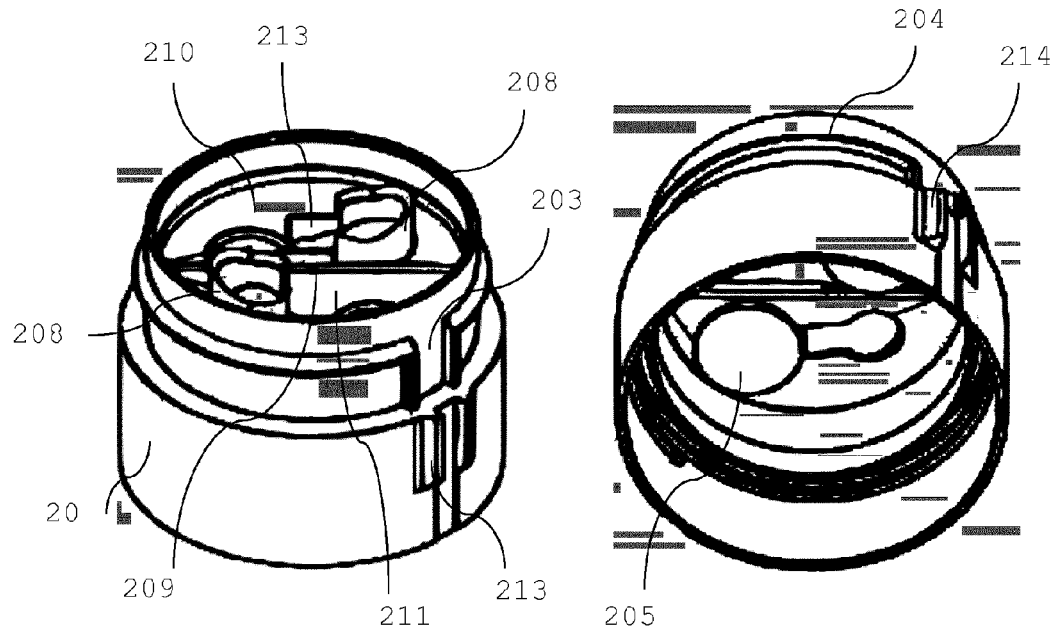
Figures 24, 25:
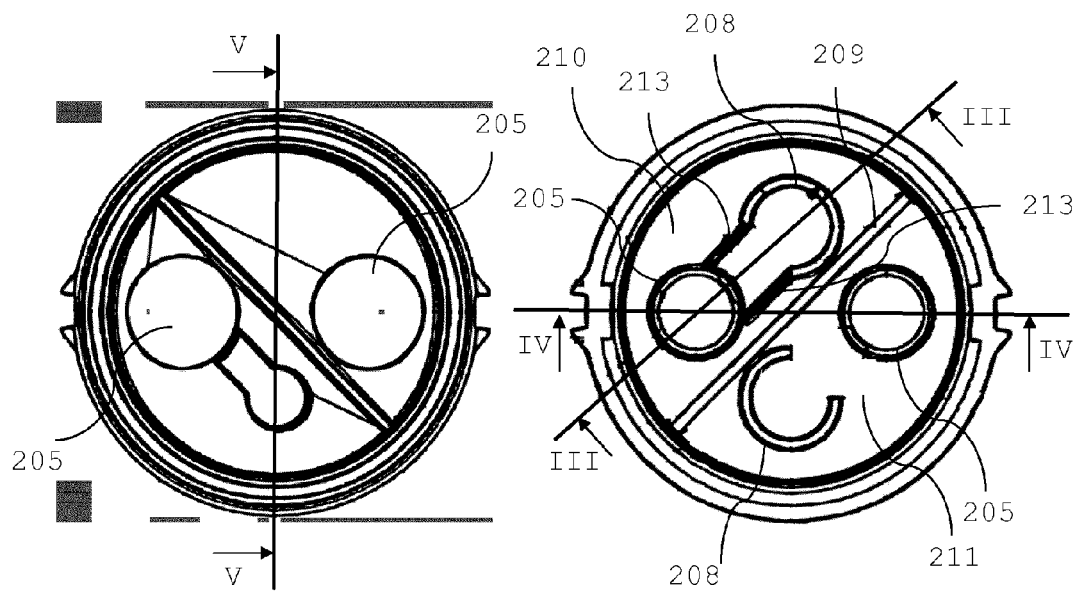
Figure 29:
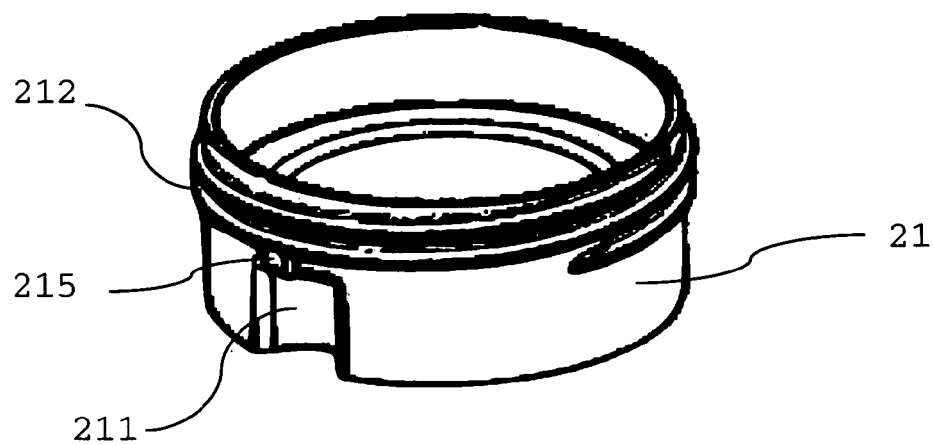
Figure 30:
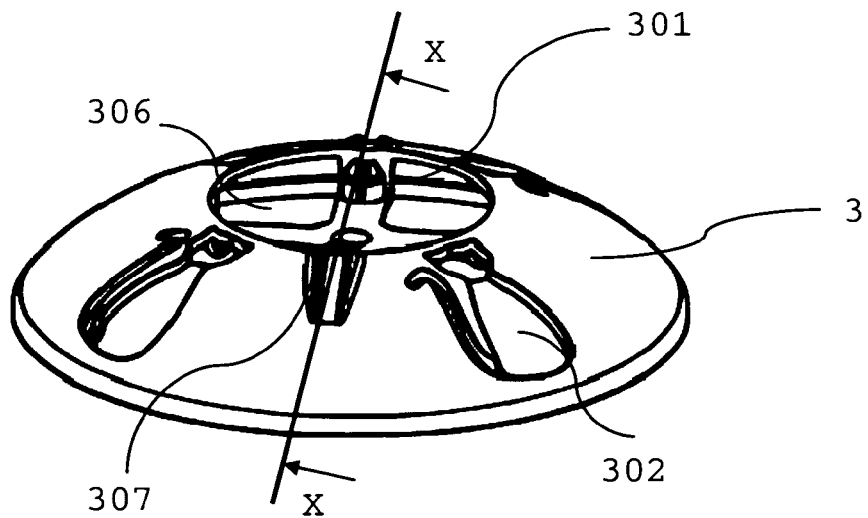
Figure 31:
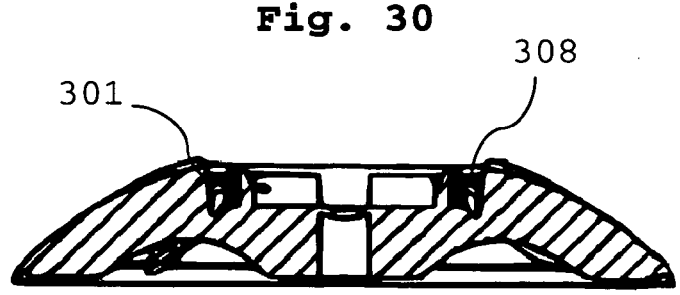

FIGS. 22-28 show views of the cap (upper part) of the second container of the further embodiment, wherein FIGS. 22 and 23 are perspective top and bottom views; FIGS. 24 and 25 are bottom and top views; FIGS. 26, 27 and 28 are cross-sectional views of the cap along lines III-III and IV-IV of FIG. 25 and along lines V-V of FIG. 24;

FIG. 29 is a perspective top view of the reservoir (bottom part) of the second container of the further embodiment;

FIGS. 30-31 are a top view of the base plate of the further embodiment and a cross-sectional side view of the base plate along lines X-X.

Figure 1:
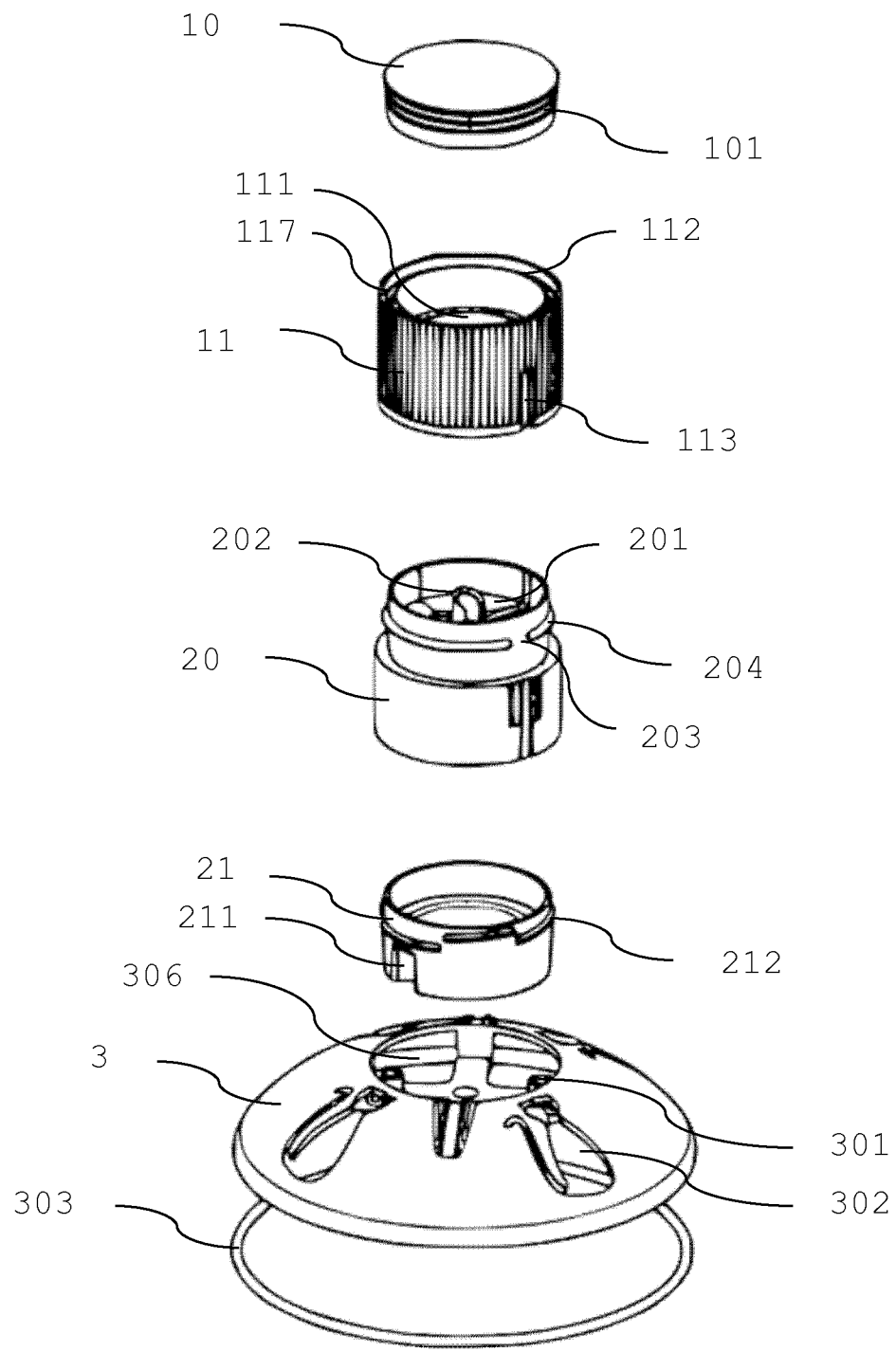
Figure 2:
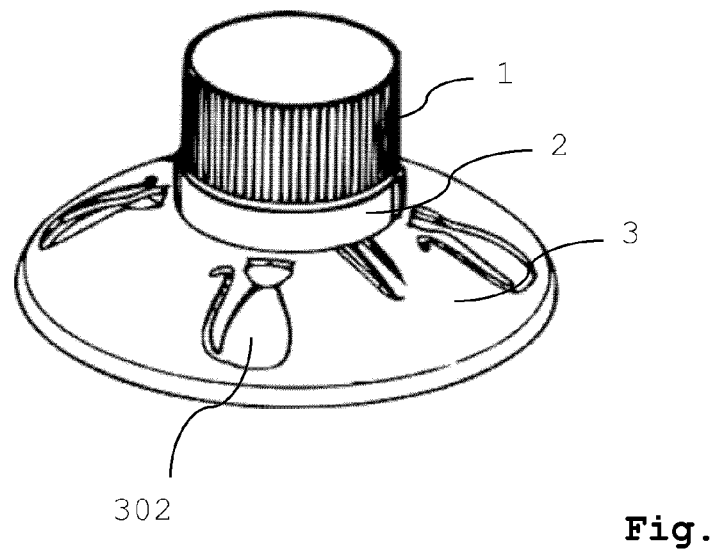
FIG. 2 shows the system of FIG. 1 in assembled state.

In FIGS. 1 and 2 an embodiment of the system according to the invention for providing a liquid-substance mixture attractive to an animal is shown in an exploded view (FIG. 1) and in an assembled state (FIG. 2). The system comprises a first container 1 and a second container 2 as well as a base plate 3 for holding the second container 2 or the assembled first and second containers, respectively. First container 1 and second container 2 both are essentially of cylindrical shape. First container 1 comprises a first reservoir 11 and a first cap 10. Second container 2 comprises a second reservoir 21 and a second cap 20. First container 1 is intended to store a liquid attractive to an animal, for example gravy (which is attractive to and tasty for cats). Second container 2 is capable of storing a substance to be administered to the animal, for example a medicament or one or more vitamins which may be in the form of a powder. Liquid and substance are stored separately in first and second containers 1 and 2, and are brought together to form a liquid-substance mixture only upon assembly of the first and second containers.

Figure 3:
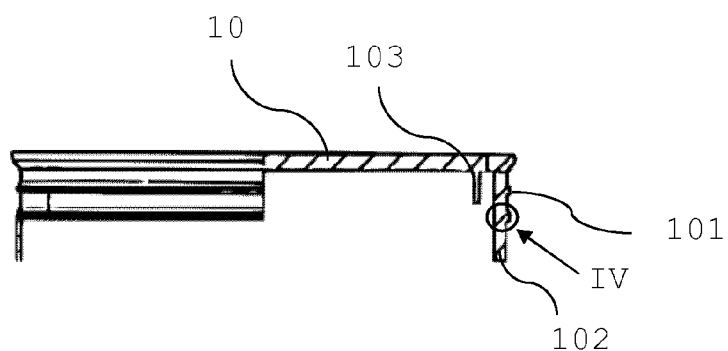
FIG. 3 shows a partially sectional side view of the cap (upper part) of the first container of the system of FIG. 1.
Figure 4:
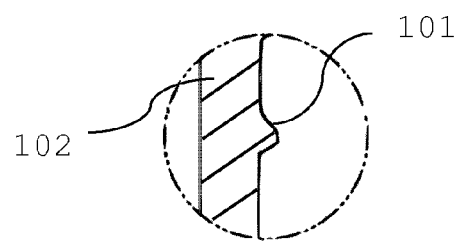
FIG. 4 shows detail IV of the cap of FIG. 3.

After filling first reservoir 11 with liquid, first cap 10 is attached to the first reservoir so as to seal first reservoir 11 in a liquid-tight manner. To form a press-fit connection between first cap 10 and first reservoir 11, first cap 10 is provided with sealing ribs 101 projecting radially outwardly from an outer cylindrical wall of first cap 10, and first reservoir 11 is provided with sealing ribs 117 (see FIG. 5 and FIG. 6) projecting radially inwardly from an inner cylindrical wall of first reservoir 11. For an additional sealing of first cap 10 and first reservoir 11, first reservoir 11 is provided with an upstanding circumferentially running collar 112 (see also FIG. 5) while first cap 10 is provided with a downwardly extending circumferentially running collar 103 (see FIG. 3). Upon mounting first cap 10 to first reservoir 11, first cap 10 is press-fitted onto first reservoir 11 so that a seal is formed with the aid of sealing ribs 101 provided on the outer surface of cylindrical wall 102 (see FIG. 3) of first cap 10 and sealing ribs 117 provided on the inner surface of cylindrical wall 120 of reservoir 11. An additional seal is formed by circumferentially running collar 103 the outer wall surface of which sealingly engages the inner wall surface of circumferentially running collar 112 (see also FIG. 5) of reservoir 11. Thus, a tamperproof, liquid-tight and oxygen-tight connection of first cap 10 and first reservoir 11 is obtained which is not intended to be reopened any more.

First reservoir 11 is further provided with alignment members in the form of protrusions 113 (see also FIG. 7) projecting inwardly from the cylindrical wall of first cap 10. Inwardly projecting protrusions 113 assist in correctly aligning first container 1 and second container 2 upon assembly. A downwardly sloped bottom wall portion 111 (see also FIG. 5) of first reservoir 11 comprises a first thin-walled weakened portion 115 at the lowermost location of downwardly sloped bottom wall portion 111. Weakened portion 115 is arranged at the center of downwardly sloped bottom wall portion 111. First cutting means in the form of cutting posts 114 are projecting downwardly from the bottom wall of first reservoir 11.

As mentioned already, first reservoir 11 comprises a bottom wall portion 111 which is downwardly sloped towards a first weakened portion 115 arranged at the center of downwardly sloped bottom wall portion 111. First weakened portion 115 comprises a thin-walled ring 118 surrounding a circular disk 121 of a more rigid wall thickness (see FIG. 7). Thus, when thin-walled ring 118 is being partially cut it is not cut over the entire circumference, so that circular disk 121 always remains connected to the bottom wall 111 via the uncut portion of thin-walled ring 118 which then forms a living hinge connecting circular disk 121 to bottom wall 111 similar to a flap, and prevents circular disk 121 from falling down.

Cutting posts 114 are arranged at a predetermined radial distance from first weakened portion 115 (which is arranged at the center of first reservoir 11) and on opposite sides thereof. Cutting posts 114 are embodied as two cut-open ring-shaped cylinders having slanted cutting edges 119 (see FIG. 7).

Figures 8, 9:
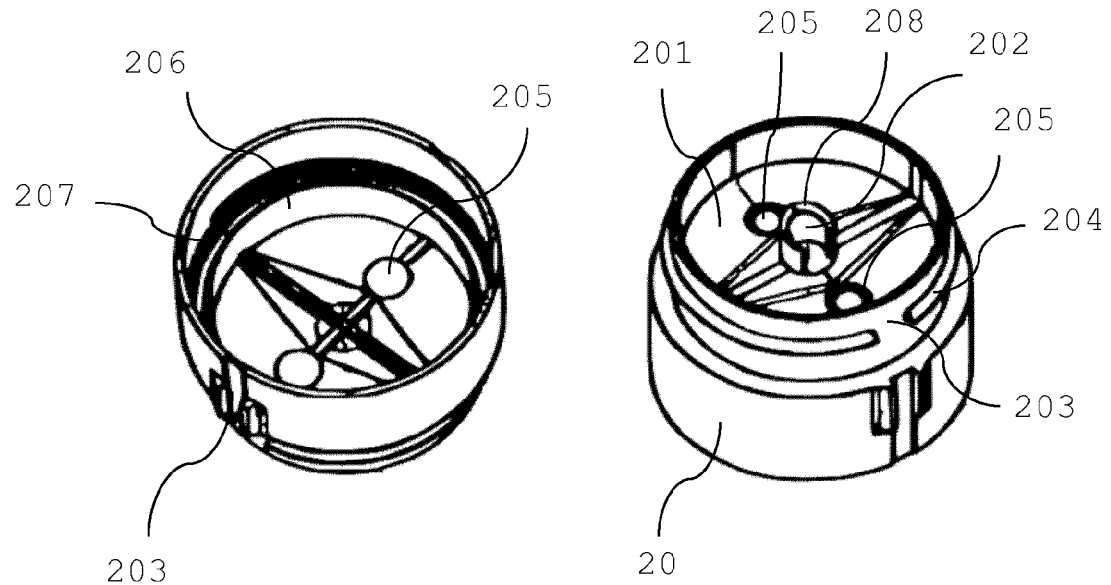
FIGS. 8-10 are perspective bottom and top views, as well as a partially sectional side view of the cap (upper part) of the second container of the system of FIG. 1.
Figure 10:
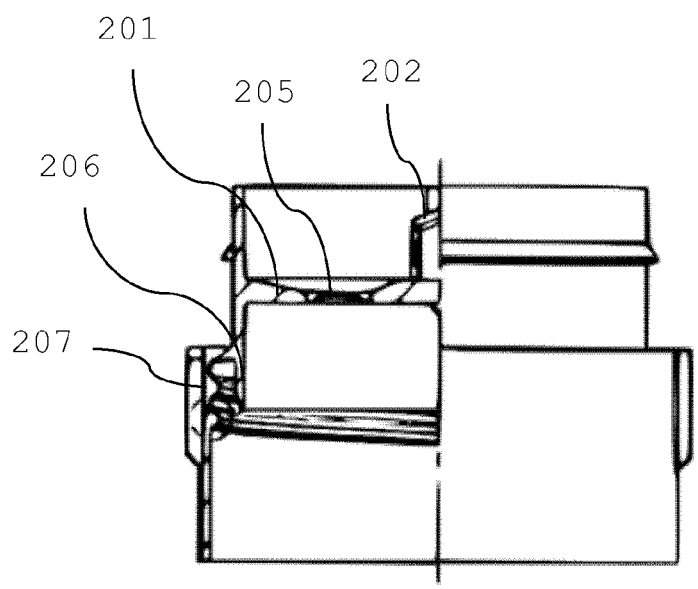
Figures 11, 12:
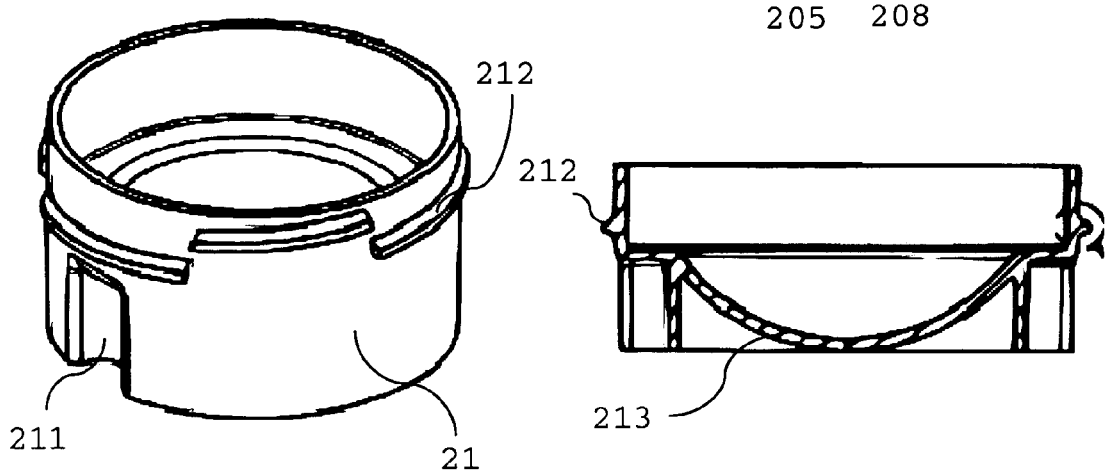
FIGS. 11-12 show a perspective view and a cross-sectional view of the reservoir of the second container of the system of FIG. 1.

Second reservoir 21 of second container 2 is intended to store a substance, preferably an active substance such as a medicament, for example an antibiotic which is to be administered to an animal. After filling second reservoir 21 with the substance, second reservoir 21 is closed by second cap 20. The connection of second reservoir 21 and second cap 20 is a non-permanent, releasable connection, which can be reopened at least once. In the embodiment shown the non-permanent, releasable connection of second cap 20 and second reservoir 21 is formed by a screw connection comprising an internal thread 207 (see FIG. 8 and FIG. 10) on an inner surface of cylindrical wall of second cap 20 and an external thread 212 on an outer cylindrical surface of second reservoir 21 (see also FIG. 11 and FIG. 12). The screw connection also allows for a secure liquid-tight sealing of second cap 20 and second reservoir 21, however, in contrast to the press-fit connection of first cap 10 and first reservoir 11, second cap 20 can be removed from second reservoir 21 by unscrewing when required. In addition, second cap 20 comprises a circumferentially running collar 206 (see FIG. 8) extending downwardly from the top wall of second cap 20, so that once second cap 20 is screwed onto second reservoir 21 collar 206 forms an additional seal by sealingly engaging against the inner surface of the cylindrical wall of second reservoir 21. After unscrewing second cap 20, second reservoir 21 may serve as a decanting bowl or may serve directly as a feeding bowl once the liquid-substance mixture has been prepared, as this will be explained in more detail below. Second reservoir 21 further comprises recesses 211 provided in an outer wall thereof for engagement of second reservoir 21 with projections 301 provided in base plate 3, as will also be explained in more detail below.

Second cap 20 further comprises a top wall which, in the embodiment shown, comprises downwardly sloped top wall portions 201 which are downwardly sloped towards two second thin-walled weakened portions 205 which are arranged at the lowermost locations of downwardly sloped top wall portions 201. The two second weakened portions 205 are embodied similar to the first weakened portions 115 and are arranged at a predetermined radial distance from the center of second cap 20 which corresponds to the radial distance of the two cutting posts 114 from the center of first reservoir 11. Second cutting means are provided on second cap 20 in the form of one cutting post 202 (see FIG. 9 and FIG. 10) which is arranged at the center of the top wall of second cap 20 and which projects upwardly therefrom. Cutting post 202 is also in the form of a cut-open ring-shaped cylinder with a slanted cutting edge 208.

Second cap 20 further comprises circumferentially running ribs 204 which are arranged on the outer wall thereof and are discontinuous at two oppositely arranged locations so that a recess 203 is formed between the ribs 204 at these locations. These recesses 203 are intended to cooperate with the inwardly projecting protrusion 113 of first reservoir 11 to align first container 1 and second container 2 upon assembly.

Figure 13:
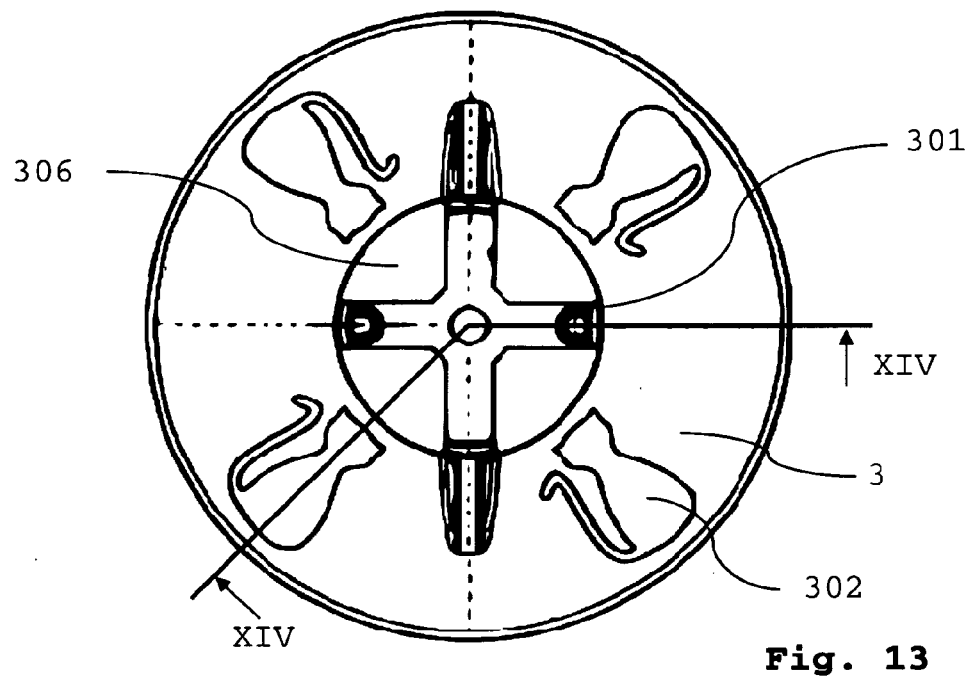
FIG. 13 shows a top view of the base plate of the system of FIG. 1.
Figure 14:
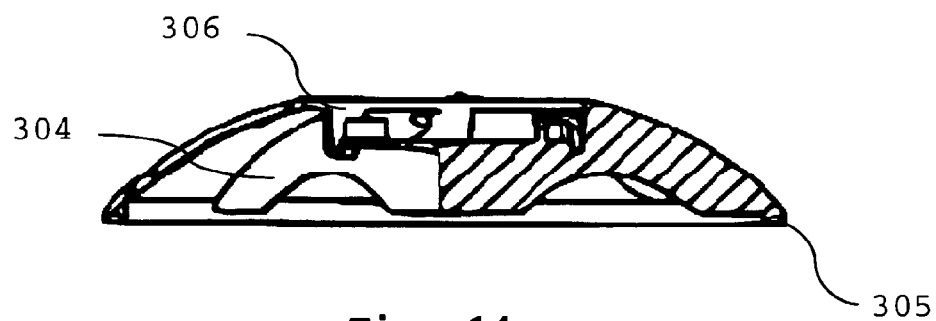
FIG. 14 shows a partially sectional side view of the base plate along line XIV-XIV of FIG. 13.

A generally dome-shaped base plate 3 comprises a central opening 306 for accommodating reservoir 21 of second container 2 when first container 1 and second container 2 are assembled. To accommodate reservoir 21 in the correct rotational position, base plate 3 comprises two projections 301 arranged to project radially inwardly into central opening 306. These projections 301 are intended to engage with recesses 211 provided in the outer wall of reservoir 21 of the second container 2. Base plate 3 further comprises an anti-slip ring 303, for example a conventional O-ring, which is inserted into a groove 305 (see also FIG. 14) provided on the bottom side of base plate 3, as well as reinforcement members 304 (see again FIG. 14). Base plate 3 is further provided with decorative elements in the form of cut-outs 302 having the shape of a cat (see also FIG. 13).

Assembly of the first container 1 will now be explained with the aid of FIGS. 3 to 6. As already mentioned, first cap 10 is provided with two circumferentially running sealing ribs 101 on the outer surface of its cylindrical wall 102, and first reservoir 11 is provided with two circumferentially running sealing ribs 117 on the inner side of the side wall 120. Sealing ribs 101 and 117 are shown enlarged in FIG. 4 and FIG. 6. After filling the liquid (for example cooked or uncooked gravy) into first reservoir 21 first cap 10 is firmly pressed into sealing reservoir 11 so that the afore-described sealing ribs form a liquid-tight and oxygen-tight seal. Collar 103 of first cap 10 (see FIG. 3) and collar 112 (see FIG. 5) of first reservoir 11 are in engagement to form an additional seal. The so filled first container 1 can then be autoclaved or otherwise be sterilized. In case uncooked gravy has been filed into first reservoir 21 sterilization is performed through autoclaving so that the uncooked gravy contained in first reservoir 21 is cooked while at the same time sterilization of first container 1 is performed. The so sterilized first container 1 may then be packed under sterile conditions into a suitable secondary packaging in which it can be long-term stored.

Assembly of the second container 2 will now be explained with the aid of FIGS. 8 to 12. First, the active substance, for example a medicament such as an antibiotic in form of a powder or granules, is filled into second reservoir 21 of second container 2, preferably under sterile conditions. Second cap 20 is then screwed onto second reservoir 20 with the aid of the internal thread 207 provided on the inner surface of the cylindrical wall of second cap 20 and the outer thread 212 provided on the outer surface of second reservoir 21. After completion of the screwing action the so closed tightly sealed second container 2 can be packed under sterile conditions into a suitable secondary packaging in which it can be long-term stored.

At the time the user wants to administer the antibiotic to an animal, for example a cat, first container 1 and second container 2 must be assembled. For this purpose, the user has to align the inwardly projecting protrusions 113 of first reservoir 11 (or of the first container 1) with the recesses 203 formed between the circumferentially running ribs 204 on the outer wall of second cap 20 (or of the second container 2). Only when being aligned, first container 1 can be moved axially towards second container 2. As can be seen in FIG. 7, first reservoir 11 is provided on its inner wall with ribs 116 running in circumferential direction. Upon axially moving first container 1 towards second container 2, inwardly projecting protrusions 113 of first reservoir 11 are moved axially in the recesses 203 between the circumferentially running ribs 204, and at the same time the inner surface of the cylindrical wall of first reservoir 11 axially passes over the circumferentially running ribs 204 until ribs 116 arranged on the inner surface of cylindrical wall of first reservoir 11 snap over ribs 204 provided on the outer surface of second cap 20.

Also, when moving first container 1 axially towards second container 2 cutting posts 114 penetrate through second weakened portions 205 and cut these weakened portions partially so that the second weakened portions 205 are pushed away in a manner similar to hinged flaps to create two openings. However, the second weakened portions 205 remain partially connected to the bottom wall of second cap 20.

Similarly, cutting post 202 penetrates through first weakened portion 115 and cuts it partially so that first weakened portion 115 is pushed away in the manner similar to a hinged flap to create an opening. However, first weakened portion remains partially connected to the bottom wall of first reservoir 21.

First reservoir 11 and second reservoir 21 are now set in communication with one another, so that the gravy contained in first reservoir 11 may flow through the centrally arranged opening formed by the pushed away first weakened portion 115 onto the downwardly sloping top wall portions 201 of second cap 20, and further through the openings formed by the pushed away second weakened portions 205 into second reservoir 21 where it can mix with the antibiotic medicament contained therein. This flowing down of the gravy may occur solely due to gravity forces. However, if desired, the mixing action can be supported by shaking the assembled first and second containers and then allowing the mixture to flow down and settle in second reservoir 21.

Once the mixture has been prepared and is contained in second reservoir 21, the assembly comprising first container 1 and second container 2 is placed into central opening 306 of base plate 3 in a rotational orientation such that projections 301 (see FIG. 13) projecting inwardly into opening 306 engage into recesses 211 of second reservoir 21 (see FIG. 11) such that second reservoir 21 is clicked in. Thus, the entire assembly of first container 1 and second container 2 is firmly attached to base plate 3 and is secured against rotation. Subsequently, second cap 20 as well as first container 1 firmly attached thereto are unscrewed from second reservoir 21. This can be easily performed by grasping first cap 10 of first container 1, pressing the assembly of first container 1 and second container 2 slightly towards base plate 3 which may rest on a support (e.g. on the floor or on a table), and by turning the assembly in the unscrewing direction. Since second reservoir 21 is firmly attached to base plate 3 in a manner secured against rotation, the rest of the assembly is unscrewed from second reservoir 21 thus exposing the mixture contained in second reservoir 21. The mixture is then presented to the animal by either pouring the mixture from second reservoir 21 into a feeding bowl, or by directly presenting the assembly of base plate and second reservoir 21 to the animal, for example to the cat. Second reservoir 21 then forms the feeding bowl. The cat can then directly access the mixture and will do so since the gravy is very attractive to the cat and the antibiotic is taste-masked by the gravy.

In FIGS. 15 to 31 a second embodiment of the system according to the invention is shown that, in an assembled state, basically corresponds to the system shown in FIG. 2. Same reference numbers as in the first embodiment according to FIGS. 1 to 14 are used for same features. Where identical or almost identical in design or function, features are not mentioned or described again. Again first cap 10 and first reservoir 11 form a first container 1 for holding a liquid attractive to an animal and second cap 20 and second reservoir 21 form a second container 2 holding a substance to be administered to an animal in the form of a liquid substance-mixture. In this second embodiment a mixing of liquid and substance is enhanced by the provision of ventilation of first and second reservoirs as will be shown further below.

Figures 15, 16:
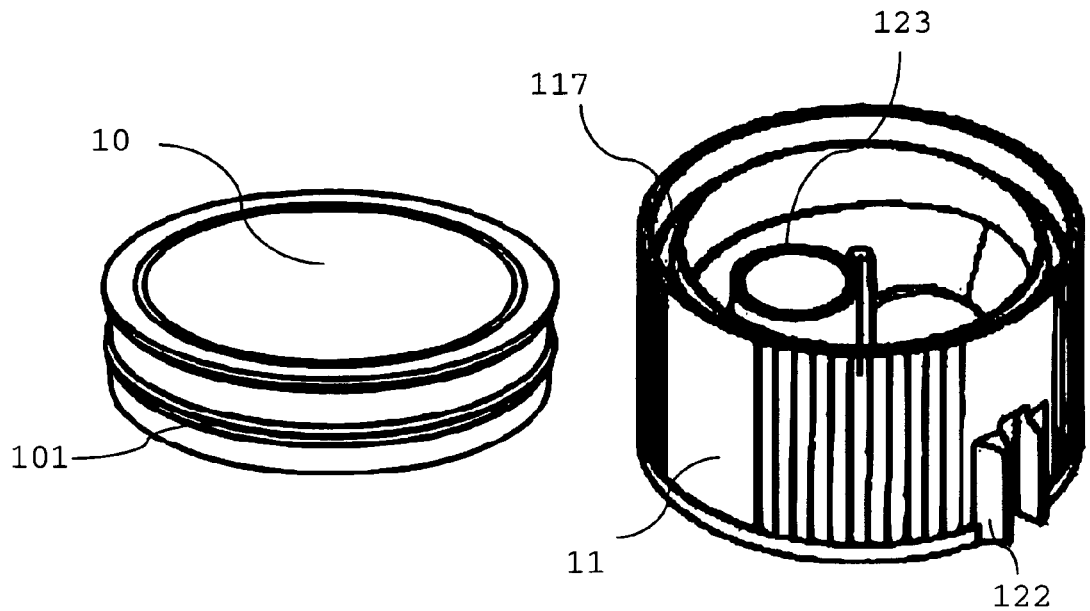

First cap 10 is provided with one sealing rib 101 for a sealing of first cap 10 and first reservoir 11, wherein first reservoir 11 is provided with one corresponding sealing rib 117 (see FIG. 15 and FIG. 16).

Two weakened portions are arranged in the bottom wall of first reservoir 11. The bottom wall is provided with a chimney-like post in the form of a cylinder 123. Cylinder 123 projects upwardly and is arranged around one of the first weakened portions 115 such that the weakened portion 115 forms the bottom of cylinder 123 (see FIGS. 17-19, FIG. 21).

Two cutting posts 114 are arranged in the bottom wall of first reservoir 11 and project downwardly. The two cutting posts 114 are arranged at a distance from the center of the bottom wall of first reservoir 11. This distance corresponds to the distance of two corresponding second weakened portions 205 and two second cutting posts 208 of second cap 20 from the center of the top wall of second cap 20. The two cutting posts of second cap 20 project upwardly from the top wall of second cap 20 (see FIGS. 22, 24 and FIG. 25).

When the first weakened portion 115 encircled by cylinder 123 is cut by the corresponding cutting post 208 of second container 2 a ventilation channel is generated from first reservoir 11, through the inside of cylinder 123 and the cut weakened portion 115. In addition, the wall of cylinder 123 prevents a direct flow of liquid from first reservoir 11 through weakened portion 115 arranged inside cylinder 123. Preferably, cylinder 123 has a height that is higher than a filling level of first reservoir 11. By these means, all or most of the liquid in first reservoir 11 flows through the other (second) first weakened portion 115 arranged in the bottom wall of first container 11 and the ventilation channel is not or not remarkably obstructed by liquid flowing through the cut weakened portion arranged in the ventilation channel. Both first weakened portions 115 and cylinder 123 are arranged at a distance from the center of the bottom wall of first reservoir 11.

As best seen in FIG. 22 and FIG. 25, a ridge 209 is provided in the top wall of second cap 20. The ridge 209 extends diagonally along the surface of the top wall of second cap 20 and divides the top surface of the second cap 20 in two halves, a 'ventilation side' 211 and a 'mixing side' 210. Each half comprises one cutting post 208 and one second weakened portion 205. On the 'mixing side' 210, two wall elements 213 are arranged between cutting post 208 and second weakened portion 205 defining a flow channel between cutting post 208 and second weakened portion 205 (see also FIG. 26). The two wall elements 213 are preferably arranged parallel to each other and preferably at a distance corresponding to the opening distance of the opening of the cut open cylinder of cutting post 208. Wall elements 213 are arranged next to cutting post 208 and may integrally be formed with cutting post 208. The one wall element 213 closer to ridge 209 may also be omitted and a guiding function for the liquid may also be taken over by a sloped wall portion 201 of the top wall of second cap 20.

If cutting post 208 cuts the corresponding first weakened portion 115 of first reservoir 11, liquid flows from the first reservoir 11 though the cut first weakened portion and inside said cutting post 208. The liquid is guided along the sloped wall portion 201 of the top wall and in the flow channel inside the two wall elements 213 to the second weakened portion 208 arranged on the 'mixing side' 210 of ridge 209. By elevated ridge 209 and wall elements 213 liquid on the 'mixing side' 210 is prevented or at least strongly hindered from passing to 'ventilation side' 211. Upon cutting the corresponding first weakened portion 115 in the cylinder 123 of first reservoir 11 by the cutting post 208 on the 'ventilation side' 211 and by cutting the second weakened portion 205 on the 'ventilation side' 211 by the respective cutting post 114 of first reservoir 11 the ventilation channel extends through the top wall of second cap 20 and into second reservoir 21. By this, liquid entering second reservoir 21 forces air or other gas out of second reservoir 21 through ventilation channel into first reservoir 11. Thereby the air or gas equalizes an underpressure that may otherwise be generated by the outflowing liquid from first reservoir 11 thus supporting a liquid flow or more generally an exchange of the content of the two containers.

By alignment members 113, 203 of first reservoir 11 and second cap 20 it is preferably guaranteed that first and second containers 1, 2, are assembled in a predefined mutual rotational position. It is preferably guaranteed that a 'ventilation side' 211 of second cap 20 corresponds with the ventilation channel of first reservoir 11, i.e. that the cutting post 208 on the 'ventilation side' 211 cuts the first weakened portion 115 inside cylinder 123.

The connection of second reservoir 21 and second cap 20 is in the embodiment shown a non-permanent, releasable connection formed by a screw connection comprising an internal thread 207 (see FIG. 23 and FIGS. 26 to 28) on an inner surface of cylindrical wall of second cap 20 and an uninterrupted external thread 212 on an outer cylindrical surface of second reservoir 21 (see FIG. 29). In addition, the outer cylindrical surface of second reservoir 21 comprises a thread stop 215 arranged above recess 211 for ensuring a tight connection of second reservoir 21 and second cap 20, as well as an alignment of second container 2 in base plate 3, especially of ribs 214 of second cap 20 with ribs 307 of base plate 3 (see FIG. 30).

Again, after unscrewing second cap 20, second reservoir 21 may serve as a decanting bowl or may serve directly as a feeding bowl once the liquid-substance mixture has been prepared.

To accommodate reservoir 21 in central opening 306 of base plate 3 in the correct rotational position, base plate 3 comprises two projections 301 arranged to project radially inwardly into central opening 306. These projections 301 engage with recesses 211 provided in the outer wall of reservoir 21 of second container 2. Projections 301 are not connected with the wall of the central opening but a slit 308 is arranged between projections 301 and wall of central opening 306 (see FIG. 31). A lower edge of the circular outer wall of second cap 20 may be inserted into slit 308 to additionally secure the second reservoir 21 or container 2, respectively, in base plate 3.

Figure 17:
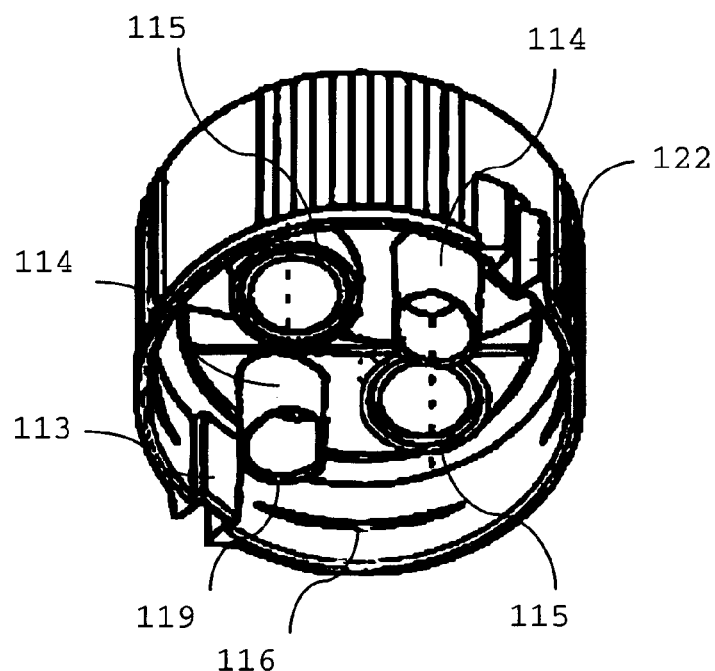

First reservoir 11 and second cap 20 are provided with optical alignment members in the form of two parallel vertically arranged ribs 122, 214 that project outwardly from the cylindrical wall of first reservoir 11 and second cap 20, respectively (see FIG. 17 and FIG. 22). Also base plate 3 is provided with optical alignment members in the form of two parallel ribs 307 arranged on the top side of base plate 3 next to central opening 306 (see FIG. 30). For simplicity reasons all optical alignment members are arranged at the same rotational position as the alignment members: Ribs 122 of first reservoir 11 and ribs 214 of second cap 20 are arranged at the same circumferential position as inwardly projecting alignment members 113 or as recesses 203, respectively; ribs 307 are arranged at the same circumferential position as projections 301 of base plate 3.

Optical alignment members 122, 214, 307 are not intended to engage with each other but serve a user for an optical alignment of first and second containers upon assembly thereof, as well as for an alignment of second container 2 or the assembled containers in base plate 3. However, if desired optical alignment members may also be constructed to include a holding function, as well as alignment members may also be constructed as optical alignment members.

Advantageously, first container 1, second container 2, and base plate 3 are all made from an injection-moldable material such as polypropylene which is also reliably autoclavable. One embodiment of the system according to the invention may have the following particular characteristics:

8 ml volume of first reservoir 11;
13 ml volume of second reservoir 21;
diameters of first container 1 and second container 2: 2 cm-10 cm, preferably 3 cm-6 cm, e.g. 4 cm-5 cm;
liquid: gravy;
substance: powder, granules, or liquid;
wall thickness of first container 1 and second container 2: 0.9 mm-1.1 mm;
wall thickness at weakened portions: 0.1 mm-0.2 mm.

The invention has been described with reference to the embodiments shown in the drawings. However, it is obvious to a person skilled in the art that many variations, modifications or changes are possible without departing from the scope of the invention. By way of example only, the number and sizes of weakened portions and the number of openings generated by partially cutting these weakened portions may be varied. Also, the manner how the cutting means are embodied may be different from the cutting posts actually shown in the drawings. All such variations, modifications or changes are intended to be within the scope of the invention which is defined by the appended claims.

The invention claimed is:

1. An article of manufacture for providing a mixture attractive to an animal, the article comprising:
separate first and second containers capable of being assembled and being closed prior to assembly, the first container comprising a first reservoir configured to hold a liquid attractive to the animal, a bottom wall, and a first cutter, the bottom wall including at least one bottom-wall weakened portion, and the first cutter connected to and extending from the bottom wall toward the second container;
wherein the second container comprises a second reservoir configured to hold a substance to be administered to the animal, a top wall, and a second cutter, the top wall including at least one top-wall weakened portion, and the second cutter connected to and extending from the top wall toward the first container; and
wherein the first cutter, the second cutter, the at least one bottom-wall weakened portion, and the at least one top-wall weakened portion are arranged such that upon assembly of the first and the second containers, the first cutter cuts the at least one top-wall weakened portion of the second container to form a top-wall aperture therein and the second cutter cuts the at least one bottom-wall weakened portion of the first container to form a bottom wall aperture therein, so that the first and the second reservoirs are set in communication with one another to allow mixing of the liquid contained in the first reservoir with the substance contained in the second reservoir to form the mixture attractive to the animal.

2. The article of manufacture according to claim 1, wherein the first cutter and the second cutter are constructed to partially cut the at least one top-wall weakened portion and the at least one bottom-wall weakened portion to form the top-wall and the bottom-wall apertures and corresponding top-wall and bottom-wall hinged flaps, which remain partially attached to the second and the first containers, respectively.

3. The article of manufacture according to claim 1, wherein the bottom wall has a downwardly sloped portion and the top wall has a downwardly sloped portion, wherein the first container and the second container are configured such that the bottom wall of the first container and the top wall of the second container are facing one another after assembly, wherein the at least one bottom-wall weakened portion is located at the lowermost location of the bottom wall of the first container and the first cutter projects from the bottom wall towards the at least one top-wall weakened portion, and
wherein the at least one top-wall weakened portion is located at the lowermost location of the top wall of the second container and the second cutter projects from the top wall towards the at least one bottom-wall weakened portion.

4. The article of manufacture according to claim 3, wherein the first cutter comprises two cutting posts and the at least one bottom-wall weakened portion is located at the center of the bottom wall of the first container, and wherein the second cutter comprises one cutting post located at the center of the top wall of the second container and the at least one top-wall weakened portion comprises two top-wall weakened portions.

5. The article of manufacture according to claim 3, wherein the at least one bottom-wall weakened portion comprises two bottom-wall weakened portions to form two bottom-wall apertures, the first container further comprising a cylinder encircling one of the two bottom-wall apertures and projecting upwardly from the bottom wall to form a ventilation channel between the first reservoir and the second container after assembly, the other of the two bottom-wall apertures permitting the liquid to flow to the second container.

6. The article of manufacture according to claim 5, the second container further comprising a cap detachably attached to the second reservoir and positioned intermediate the first container and the second reservoir after assembly, the cap including the top wall, the top wall comprising a ridge, the downwardly sloped portion of the top wall comprising two downwardly sloped portions arranged on each side of the ridge, the second cutter comprising two cutting posts and the at least one top-wall weakened portion comprising two top-wall weakened portions, one of the two top-wall weakened portions and one of the two cutting posts arranged on each side of the ridge, thereby forming a ventilation side and a mixing side of the second container.

7. The article of manufacture according to claim 1, wherein the first and the second containers comprise alignment members providing mutual rotational alignment of the first and the second containers upon assembly.

8. The article of manufacture according to claim 1, wherein the first container comprises two parts configured to be assembled to be liquid-tight and oxygen-tight.

9. The article of manufacture according to claim 8, wherein the two parts of the first container are configured to be non-detachably attached during assembly, wherein the second container comprises two parts configured to be detachably attached.

10. The article of manufacture according to claim 1, further comprising a base plate configured to receive and hold at least one of the first and the second containers.

11. The article of manufacture according to claim 10, wherein the base plate comprises a slip-resistant portion at its bottom side.

12. The article of manufacture according to claim 10 wherein the base plate and the second container comprise means for fixedly mounting the second container and the base plate to each other.

13. The article of manufacture according to claim 1, wherein the first container contains at least one of gravy and another liquid attractive to the animal, and wherein the second container comprises at least one of an active substance and a vitamin.

14. The article of manufacture according to claim 1, wherein the first container comprises an oxygen scavenger.

15. An article of manufacture according to claim 1, wherein the bottom wall has a wall thickness, an outer portion, an inner portion, and an intermediate portion between the outer portion and the inner portion, and the inner portion has a thickness smaller than the wall thickness, thereby defining the at least one weakened portion in said bottom wall.

16. A method of providing a mixture, the method comprising: aligning a first container and a second container, the first container including a first reservoir containing a liquid, a first cutter, and a bottom wall with a bottom-wall weakened portion, the first cutter connected to and extending from the bottom wall toward the second container, the second container including a second reservoir containing a substance, a second cutter, and a top wall with a top-wall weakened portion, the second cutter connected to and extending from the top wall toward the first container; and axially translating the first container toward the second container until the first cutter cuts the top-wall weakened portion to form a top-wall aperture therethrough and the second cutter cuts the bottom-wall weakened portion to form a bottom-wall aperture therethrough, the bottom-wall aperture and the top-wall aperture establishing fluid communication between the first reservoir and the second reservoir, whereby the liquid flows through at least one of the bottom-wall and the top-wall apertures to mix with the substance to form a mixture attractive to an animal.

17. The method of claim 16, wherein the second container further comprises a cap removably attached to the second reservoir, the cap comprising the second cutter and the top-wall weakened portion, the method further comprising permitting the liquid to drain from the first reservoir through the cap to the second reservoir; and thereafter detaching the cap from the second reservoir.

18. The method of claim 17, further comprising attaching the first container to the cap, wherein detaching the cap from the second reservoir comprises separating the first container from the second container to detach the cap from the second reservoir.

19. The method of claim 16, wherein the liquid comprises uncooked food, and wherein prior to aligning the first container and the second container, the method further comprises sealing the uncooked food in the first reservoir; and cooking the uncooked food by autoclaving the sealed first reservoir.

* * * * *